United States Patent
Zhang

(10) Patent No.: US 12,372,314 B2
(45) Date of Patent: Jul. 29, 2025

(54) VEHICLE HEAT EXCHANGER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 18/371,634

(22) Filed: Sep. 22, 2023

(65) Prior Publication Data

US 2025/0102245 A1    Mar. 27, 2025

(51) Int. Cl.
| | |
|---|---|
| *F28D 7/02* | (2006.01) |
| *B60H 1/00* | (2006.01) |
| *F28D 21/00* | (2006.01) |
| *F28F 1/02* | (2006.01) |
| *F28F 7/02* | (2006.01) |

(52) U.S. Cl.
CPC ............ *F28F 7/02* (2013.01); *B60H 1/00278* (2013.01); *B60H 1/00885* (2013.01); *F28D 21/00* (2013.01); *F28F 1/02* (2013.01); *F28D 2021/008* (2013.01)

(58) Field of Classification Search
CPC .......... F28F 7/02; F28F 1/02; B60H 1/00278; B60H 1/00885; F28D 21/00; F28D 2021/008
USPC ......................................................... 165/165
See application file for complete search history.

(56) References Cited

U.S. PATENT DOCUMENTS

| | | | |
|---|---|---|---|
| 10,476,051 B2 | 11/2019 | Mardall et al. | |
| 10,932,395 B2 | 2/2021 | Yen et al. | |
| 11,389,765 B2 | 7/2022 | Roy et al. | |
| 2009/0139781 A1 | 6/2009 | Straubel | |
| 2020/0033070 A1 | 1/2020 | Vlahinos et al. | |
| 2020/0333088 A1 | 10/2020 | Manzo | |
| 2021/0156339 A1 | 5/2021 | Rathay et al. | |
| 2022/0186947 A1 | 6/2022 | Boetcher et al. | |
| 2022/0250762 A1 | 8/2022 | Sperrin et al. | |

FOREIGN PATENT DOCUMENTS

FR           4033193 A1 *   7/2022   ............. B33Y 80/00

* cited by examiner

*Primary Examiner* — Davis D Hwu
(74) *Attorney, Agent, or Firm* — Vichit Chea; Price Heneveld LLP

(57) ABSTRACT

A heat exchanger includes a housing. The housing defines a refrigerant inlet, a refrigerant outlet opposing the refrigerant inlet, at least one coolant inlet, and at least one coolant outlet. A gyroid structure is disposed within the housing. The gyroid structure defines a set of refrigerant channels that direct refrigerant through the gyroid structure, a first set of coolant channels that direct coolant through a first region of the gyroid structure, and a second set of coolant channels that direct coolant fluid through a second region of the gyroid structure. A valve is disposed within the refrigerant inlet. The valve is configured to direct refrigerant fluid to at least one of the first region and the second region of the gyroid structure.

7 Claims, 7 Drawing Sheets

VEHICLE HEAT EXCHANGER

FIELD OF THE DISCLOSURE

The present disclosure generally relates to a heat exchanger, and more specifically, a heat exchanger for a vehicle.

BACKGROUND OF THE DISCLOSURE

Motor vehicles may include energy storage systems such as battery systems. Battery systems may produce excess heat while charging or discharging, which can result in battery system temperature rising to elevated operating temperatures. A compact and efficient cooling system is desirable to cool the battery system and maintain a desired operating temperature.

SUMMARY OF THE DISCLOSURE

According to a first aspect of the present disclosure, a heat exchanger is provided and includes a housing defining a refrigerant inlet, a refrigerant outlet opposing the refrigerant inlet, at least one coolant inlet, and at least one coolant outlet, and a gyroid structure disposed within the housing, the gyroid structure defining a set of refrigerant channels that direct refrigerant fluid through the gyroid structure and at least one set of coolant channels that direct coolant fluid through the gyroid structure. The heat exchanger also includes a first conical recess defined in the gyroid structure and proximate the refrigerant inlet, the first conical recess defining a refrigerant introduction channels that are in fluid communication with the set of refrigerant channels, and a second conical recess defined in the gyroid structure and proximate the refrigerant outlet, the second conical recess defining refrigerant removal channels that are in fluid communication with the set of refrigerant channels.

Embodiments of the first aspect of the present disclosure can include any one or a combination of the following features:
- the gyroid structure defines at least one coolant inlet receiving cavity proximate the at least one coolant inlet and at least one coolant outlet receiving cavity proximate the at least one coolant outlet;
- the set of refrigerant channels direct refrigerant fluid in a counter-flow to a flow of the coolant fluid in the at least one set of coolant channels;
- the at least one set of coolant channels includes a first set of coolant channels that flow through a first region of the gyroid structure and a second set of coolant channels that flow through a second region of the gyroid structure, the second set of coolant channels directing a flow of the coolant fluid in a direction parallel to a flow of the coolant fluid in the first set of coolant channels;
- the refrigerant fluid flows through the first region and the second region of the gyroid structure;
- the refrigerant inlet is defined on a front panel of the housing and the refrigerant outlet is defined on a rear portion of the housing, and the at least one coolant inlet and the at least one coolant outlet are defined on a side panel of the housing;
- the at least one coolant inlet includes a first coolant inlet defined on a first side panel of the housing and a second coolant inlet defined on a second side panel of the housing, and the at least one coolant outlet includes a first coolant outlet defined on the first side panel of the housing and a second coolant outlet defined on the second side panel of the housing; and
- the first conical recess extends towards the second conical recess.

According to a second aspect of the present disclosure, a heat exchanger is provided and includes a housing defining a refrigerant inlet, a refrigerant outlet opposing the refrigerant inlet, at least one coolant inlet, and at least one coolant outlet. The heat exchange also includes a gyroid structure disposed within the housing, the gyroid structure defining a set of refrigerant channels that direct refrigerant fluid through the gyroid structure, a first set of coolant channels that direct coolant fluid through a first region of the gyroid structure, and a second set of coolant channels that direct coolant fluid through a second region of the gyroid structure. The heat exchanger further includes a valve disposed within the refrigerant inlet, the valve being configured to direct refrigerant fluid to at least one of the first region and the second region of the gyroid structure.

Embodiments of the second aspect of the present disclosure can include any one or a combination of the following features:
- a first conical recess defined in the gyroid structure and proximate the refrigerant inlet, the first conical recess defining a refrigerant introduction channels that are in fluid communication with the set of refrigerant channels, and a second conical recess defined in the gyroid structure and proximate the refrigerant outlet, the second conical recess defining refrigerant removal channels that are in fluid communication with the set of refrigerant channels;
- the at least one coolant inlet includes a first coolant inlet defined on a first side panel of the housing and a second coolant inlet defined on a second side panel of the housing, and the at least one coolant outlet includes a first coolant outlet defined on the first side panel of the housing and a second coolant outlet defined on the second side panel of the housing;
- the set of refrigerant channels direct refrigerant fluid in a counter-flow to a flow of the coolant fluid in the first set of coolant channels and the second set of coolant channels;
- the first region of the gyroid structure defines a first coolant inlet receiving cavity proximate the first coolant inlet and a first coolant outlet receiving cavity proximate the first coolant outlet, and the second region of the gyroid structure defines a second coolant inlet receiving cavity proximate the second coolant inlet and a second coolant outlet receiving cavity proximate the second coolant outlet; and
- a first coolant loop in fluid communication with the first set of coolant channels and a second coolant loop in fluid communication with the second set of coolant channels, the first coolant loop directing coolant to a battery system of the vehicle and the second coolant loop directing coolant to a heating ventilation and air conditioning system.

According to a third aspect of the present disclosure, a heat exchanger is provided and includes a housing defining a refrigerant inlet, a refrigerant outlet opposing the refrigerant inlet, at least one coolant inlet, and at least one coolant outlet, and a gyroid structure disposed within the housing and having a first region and a second region, the gyroid structure defining a set of refrigerant channels that direct refrigerant fluid through the gyroid structure, and at least one set of coolant channels that direct coolant fluid through at least one of the first region and the second region. The heat exchanger also includes a valve disposed within the refrigerant inlet, the valve being configured to direct refrigerant fluid to at least one of the first region and the second region of the gyroid structure, a first coolant loop in fluid communication with the first region of the gyroid structure, the first coolant loop directing coolant to a battery system of the vehicle, and a second coolant loop in fluid communication with the second region of the gyroid structure, the second coolant loop directing coolant to a heating, ventilation, and air conditioning system. The heat exchanger further includes a controller in communication with the valve, the controller being configured to actuate the valve to a first position in response to a detected first condition and to actuate the valve to a second position in response to a detected second condition, the first position directs a greater amount of refrigerant fluid through the first region, and the second position directs a greater amount of refrigerant fluid through the second region.

Embodiments of the third aspect of the present disclosure can include any one or a combination of the following features:

- the controller determines the first condition when coolant fluid in the first coolant loop requires greater cooling than coolant fluid in the second coolant loop, and the controller determines the second condition when coolant fluid in the first coolant loop requires less cooling than coolant fluid in the second coolant loop;
- a first conical recess defined in the gyroid structure and proximate the refrigerant inlet, the first conical recess defining refrigerant introduction channels that are in fluid communication with the set of refrigerant channels, and a second conical recess defined in the gyroid structure and proximate the refrigerant outlet, the second conical recess defining refrigerant removal channels that are in fluid communication with the set of refrigerant channels;
- the first region of the gyroid structure defines a first coolant inlet receiving cavity proximate the first coolant inlet and a first coolant outlet receiving cavity proximate the first coolant outlet, and the second region of the gyroid structure defines a second coolant inlet receiving cavity proximate the second coolant inlet and a second coolant outlet receiving cavity proximate the second coolant outlet;
- the set of refrigerant channels direct refrigerant fluid in a counter-flow to a flow of the coolant fluid in the first set of coolant channels and the second set of coolant channels; and
- the first region of the gyroid structure defines a first coolant inlet receiving cavity proximate the first coolant inlet and a first coolant outlet receiving cavity proximate the first coolant outlet, and the second region of the gyroid structure defines a second coolant inlet receiving cavity proximate the second coolant inlet and a second coolant outlet receiving cavity proximate the second coolant outlet.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
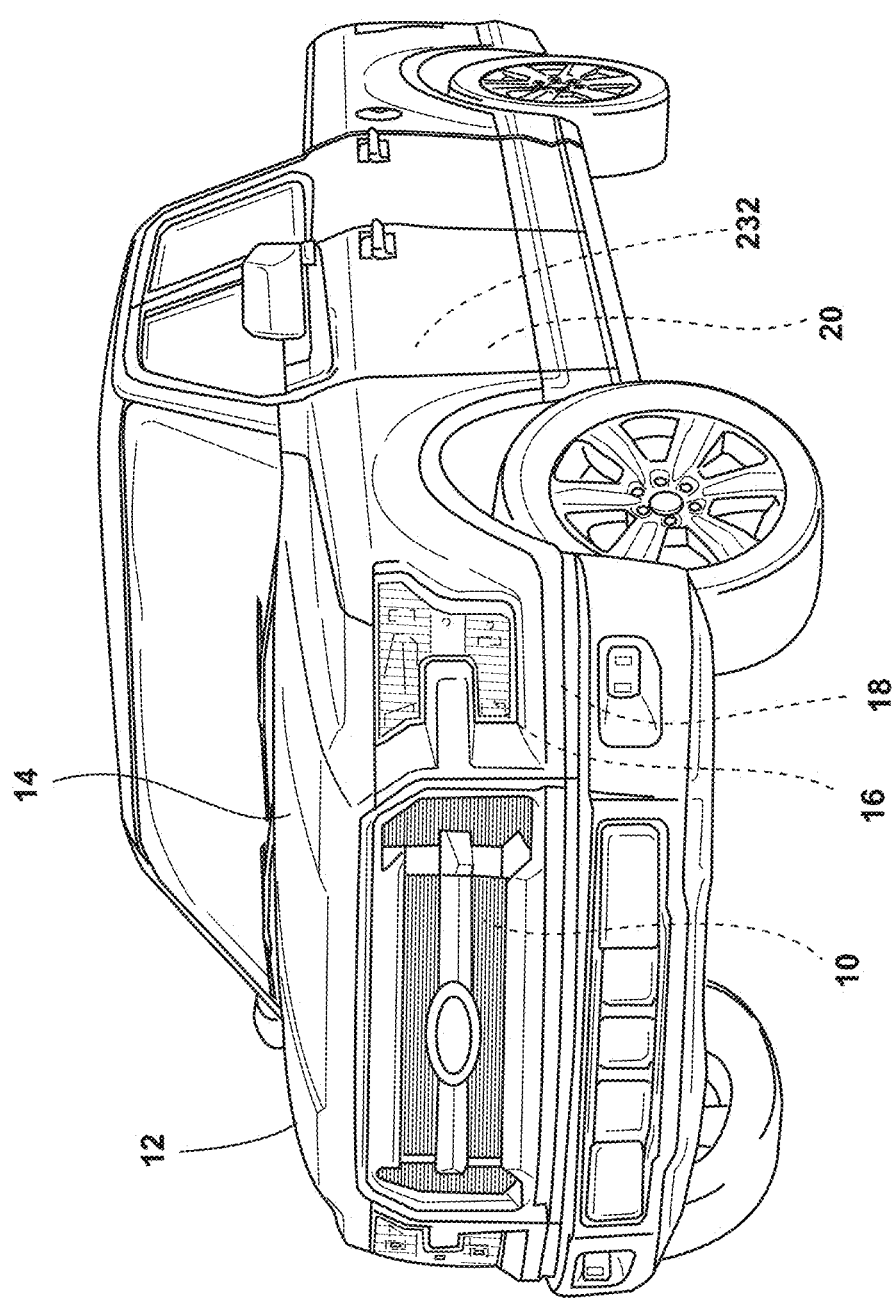
FIG. 1 is a perspective view of a vehicle with a heat exchanger, according to one embodiment.
Figure 2:
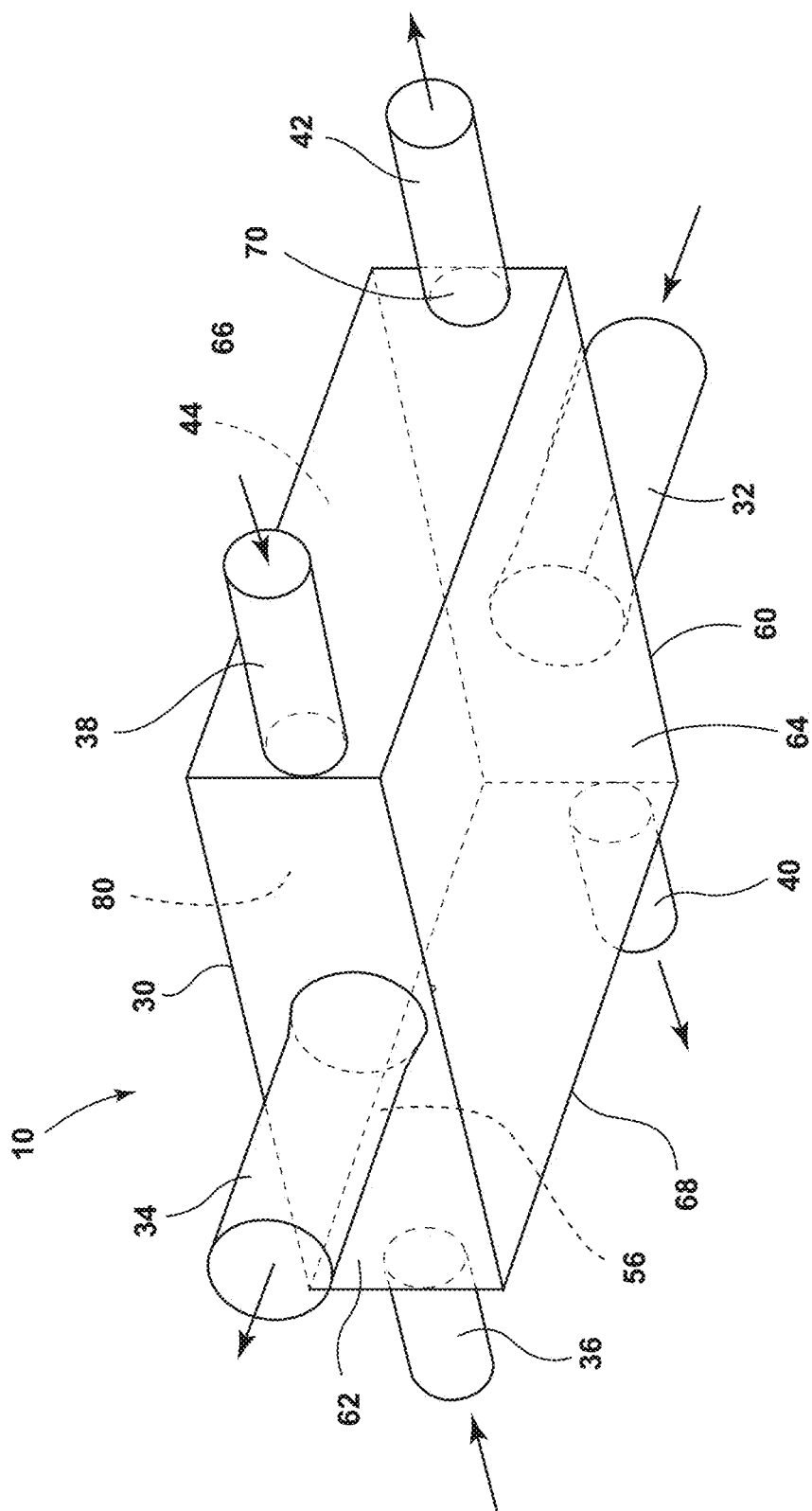
FIG. 2 is a front perspective view of a heat exchanger. According to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat exchanger. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, reference numeral 12 generally designates a vehicle that includes a vehicle body 14 and a drive unit 16. The drive unit 16 of the vehicle 12 may include a battery system 18 in aspects where the vehicle 12 is configured as a battery electric vehicle (BEV) or a hybrid electric vehicle (HEV). The battery system 18 is in electrical communication with the drive unit 16 of the vehicle 12, such as one or more electric motors that are mechanically coupled to wheels of the vehicle 12. The drive unit 16 of the vehicle 12 may additionally or alternatively include an internal combustion engine (ICE) or a fuel cell to provide operative force for the vehicle 12.

As the battery system 18 provides electricity to the drive unit 16, it may be desirable to maintain an operating temperature of the battery system 18 using a cooling system 20 to deliver coolant to the battery system 18. Additionally, it may be desirable to cool additional aspects of the vehicle 12, such as a heating ventilation and air conditioning (HVAC) system 22, while still cooling the battery system 18. In particular, the cooling system 20 may comprise one or more heat exchangers 10 to cool the battery system 18 and additional systems of the vehicle 12 by efficiently transferring heat between a coolant fluid and a refrigerant fluid in a compact structure.

Referring to FIGS. 1-7, the vehicle 12 includes the heat exchanger 10. The heat exchanger 10 includes a housing 30. The housing defines a refrigerant inlet 32, a refrigerant outlet 34 that opposes the refrigerant inlet 32, a first coolant inlet 36, a second coolant inlet 38, a first coolant outlet 40, and a second coolant outlet 42. A gyroid structure 44 is disposed within the housing 30. The gyroid structure 44 defines a set of refrigerant channels 46 that direct refrigerant fluid through the gyroid structure 44. The gyroid structure 44 also defines a first set of coolant channels 48 that direct coolant fluid through a first region 50 of the gyroid structure 44 and a second set of coolant channels 52 that direct coolant fluid through a second region 54 of the gyroid structure 44. A valve 56 is positioned in the refrigerant inlet 32. The valve 56 is configured to direct refrigerant fluid to at least one of the first region 50 and the second region 54 of the gyroid structure 44.

Referring to FIGS. 2-6, the heat exchanger 10 includes the housing 30. The housing 30 includes a front panel 60, a rear panel 62 opposing the front panel 60, a bottom panel 64 and a top panel 66 extending between the front panel 60 and the rear panel 62, and a first side panel 68 and a second side panel 70 opposing the first side panel 68. According to various aspects, the housing 30 can define one of various shapes, such as a quadrilateral shape, a rounded shape, and/or one of other various shapes. According to various aspects, the housing 30 is configured to enclose various components of the heat exchanger 10, as provided herein.

Referring to FIGS. 2-7, the housing 30 may be fabricated in an additive manufacturing process that manufactures additional components of the heat exchanger 10. In other embodiments, the housing 30 may be fabricated in a separate manufacturing process, wherein additional components of the heat exchanger 10 are attached to the housing 30.

Figure 5:
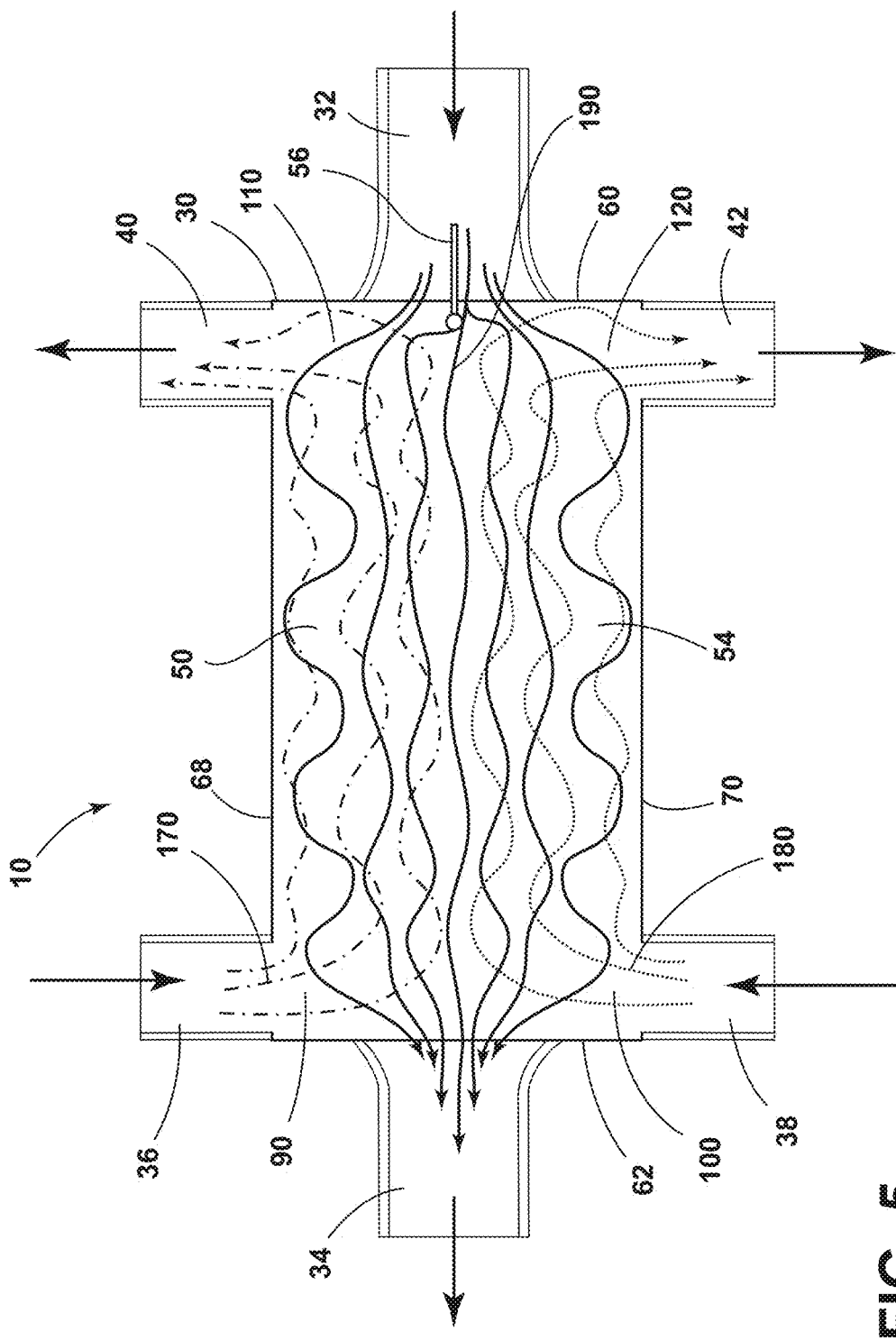
FIG. 5 is a top view of a heat exchanger with a first coolant path, a second coolant path, and a refrigerant path that is directed by a valve, according to one embodiment.
Figure 6:
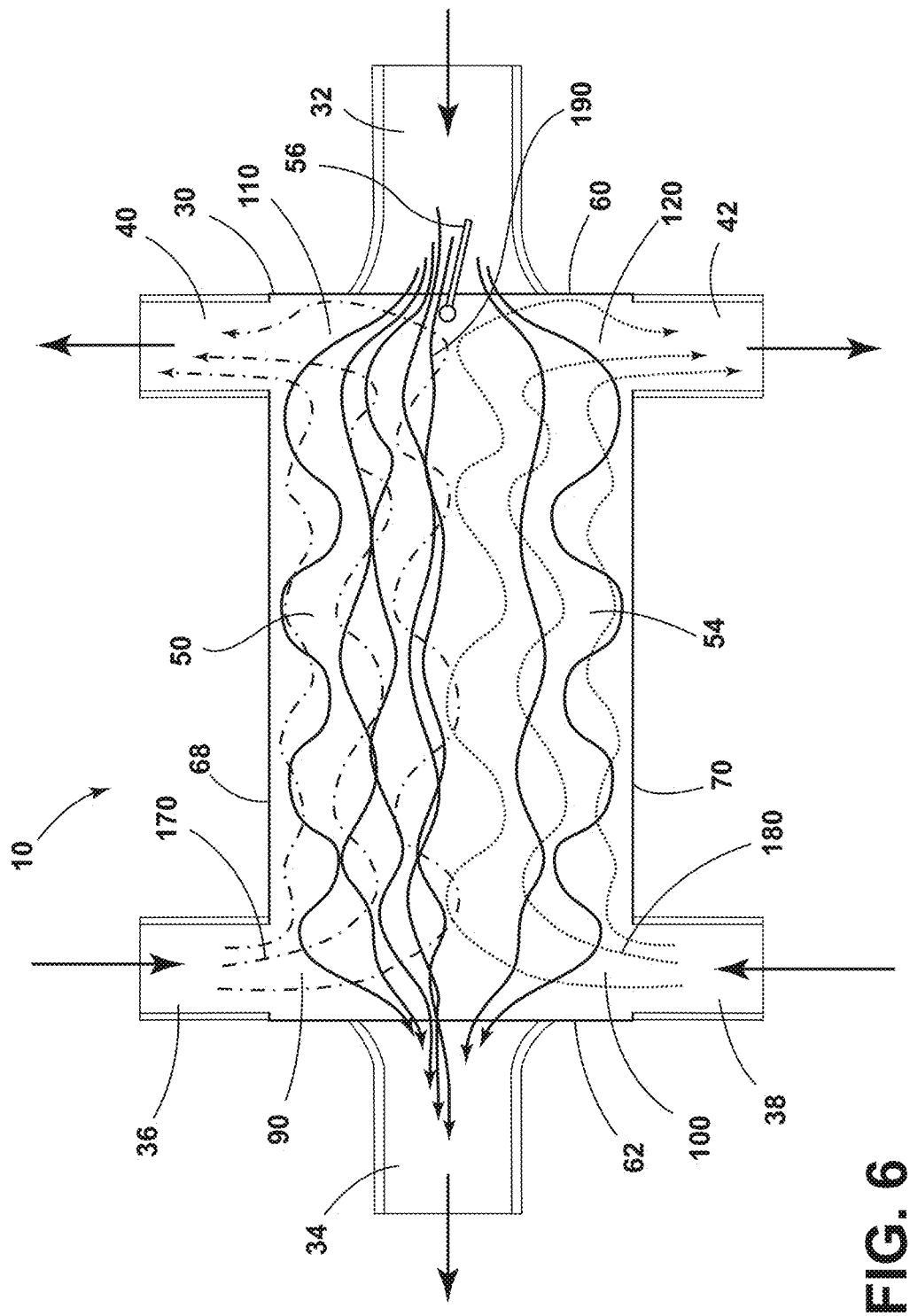
FIG. 6 is a top view of a heat exchanger with a first coolant path, a second coolant path, and a refrigerant path that is directed to by a valve to a first region of the heat exchanger, according to one embodiment.

Referring to FIGS. 5 and 6, the housing 30 defines at least one coolant path that is in thermal communication with at least one refrigerant path 190. In some examples, the housing 30 has a structure that defines the first coolant path 170, the second coolant path 180, and the refrigerant path 190. The first coolant path 170 and the second coolant path 180 may be in thermal communication with the refrigerant path 190 such that thermal transfer occurs, thereby heating fluid in the refrigerant path 190 and cooling fluid in the first coolant path 170 and the second coolant path 180.

Figure 3:
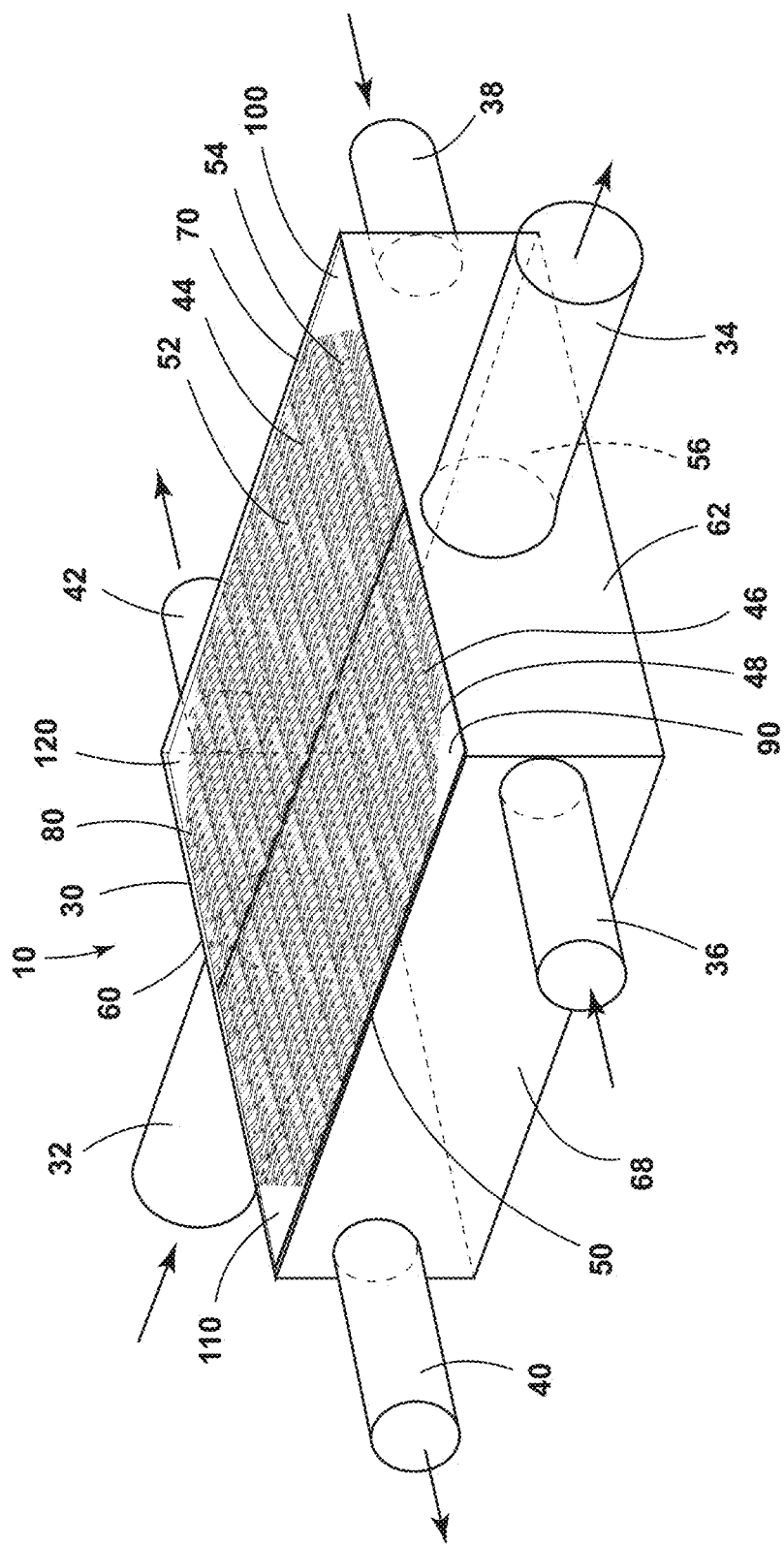
FIG. 3 is a front perspective view of a heat exchanger with a gyroid structure, according to one embodiment.
Figure 4:
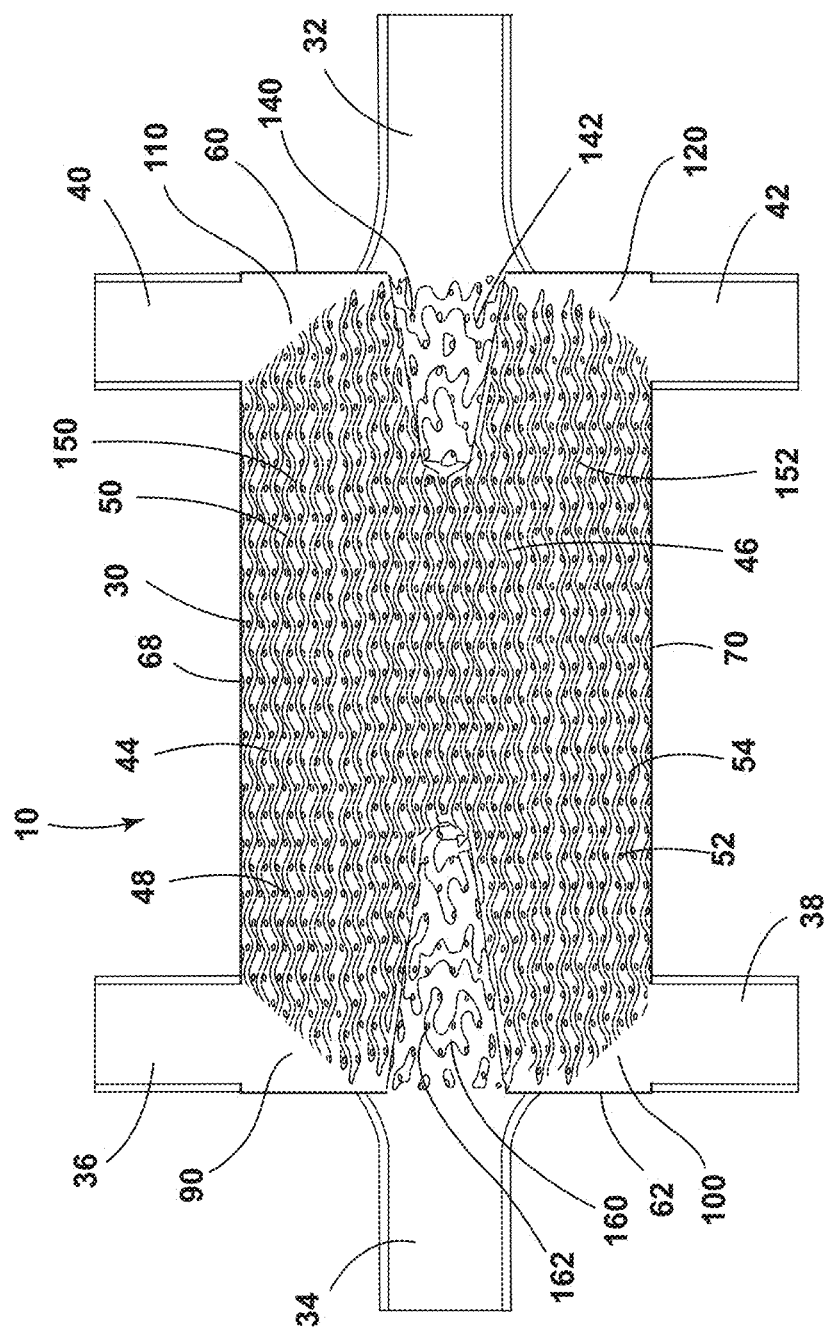
FIG. 4 is a top elevational, cross-sectional view of a heat exchanger with a first conical recess and a second conical recess, according to one embodiment.

Referring now to FIGS. 3 and 4, the housing 30 can enclose one or more gyroid structures 44. In some examples, the housing 30 can enclose the gyroid structure 44 in an internal cavity 80 of the housing 30. As used herein, a gyroid structure is a three-dimensional lattice which forms at least two interpenetrating labyrinths. The bulk of the gyroid structure, defined as channels that are not bound by the heat exchanger housing 30 are intersection-free and infinitely triply periodic minimal surfaces. The bulk of the gyroid structure has a structure that can be approximated through the equation sin ([x] cos [y])+ (sin [y] cos [z])+ (sin [z] cos [x])=0, where x, y, and z are coordinates for a point on a 3-dimensional graph having an x-, y-, and z-axis. Gyroids have large surface-area-to-volume ratios, and when a gyroid structure is incorporated into the heat exchanger 10, the gyroid structure 44 allows substantial thermal contact between the fluids housed within the passages. Additionally, it is generally contemplated that, in aspects where the housing 30 encloses multiple gyroid structures, that one or more barrier plates, channels dividers, and/or various other structures may be disposed within the housing 30 to selectively direct fluid through the gyroid structure 44.

According to various aspects, the gyroid structure 44, as illustrated in FIGS. 4 and 5, may define one or more channels via the interpenetrating labyrinths that, in turn, define at least two fluid channels. For example, the gyroid structure 44 may define the first coolant channel 48, the second coolant channel 52 flowing in parallel with the first coolant channel 48, and the refrigerant channel 46 flowing in a counter-flow to the first coolant channel 48 and/or the second coolant channel 52. In such examples, the gyroid structure 44 may define the first coolant channel 48 on the first region 50 of the gyroid structure 44 and the second coolant channel 52 on the second region 54 of the gyroid structure 44 such that the first coolant channel 48 and the second coolant channel 52 are non-intersecting. The refrigerant channel 46 may then flow in a counter-direction along the first region 50 and the second region 54.

Referring now to FIGS. 2-7, the heat exchanger 10 includes the first coolant inlet 36 and the second coolant inlet 38 extending off of the housing 30. In some examples, the first coolant inlet 36 is coupled to the housing 30 or integrally formed with the housing 30. For example, the first coolant inlet 36 may be integrally formed with the housing 30 and extend off of the first side panel 68, where the first coolant inlet 36 is proximate the rear panel 62 of the housing 30. In other aspects, the second coolant inlet 38 is coupled to the housing 30 or integrally formed with the housing 30. For example, the second coolant inlet 38 may be integrally formed with the housing 30 and extend off of the second side panel 70, where the second coolant inlet 38 is proximate the rear panel 62 of the housing 30. Additionally, it is generally contemplated that the first coolant inlet 36 may be coupled to the same panel, or a different panel of the housing 30 than the second coolant inlet 38. According to various aspects, the first coolant inlet 36 is intended to guide coolant fluid into the first region 50 of the gyroid structure 44 and the second coolant inlet 38 is intended to guide coolant fluid into the second region 54 of the gyroid structure 44. Additionally, it is generally contemplated that the first coolant inlet 36 and the second coolant inlet 38 may define various shapes and/or sizes and be perpendicular and/or obliquely oriented relative to the housing 30 such that the rate of coolant fluid flow may be one of various flow rates.

Referring now to FIGS. 2-6, the first coolant inlet 36 may direct fluid into a first coolant inlet receiving cavity 90. The first coolant inlet receiving cavity 90 may be defined as the space between the first coolant inlet 36, the housing 30, and the first region 50 of the gyroid structure 44. The first coolant inlet receiving cavity 90 may define one of various shapes, such as a quadrilateral shape, a triangular shape, a rounded shape, and/or one of other various shapes. According to various aspects, the first coolant inlet receiving cavity 90 defines a fluid receiving cavity that permits uniform flow of the coolant fluid into the first set of coolant channels 48.

Referring again to FIGS. 2-6, the second coolant inlet 38 may direct fluid into a second coolant inlet receiving cavity 100. The second coolant inlet receiving cavity 100 may be defined as the space between the second coolant inlet 38, the housing 30, and the second region 54 of the gyroid structure 44. The second coolant inlet receiving cavity 100 may define one of various shapes, such as a quadrilateral shape, a triangular shape, a rounded shape, and/or one of other various shapes. According to various aspects, the second coolant receiving cavity 100 defines a fluid receiving cavity that permits uniform flow of the coolant fluid into the second set of coolant channels 52.

Additionally, it is generally contemplated, that the gyroid structure 44 may define coolant introduction channels that encompass an outer periphery of the first coolant inlet receiving cavity 90 and the second coolant inlet receiving cavity 100. The coolant introduction channels may have a shape, size, and/or cross-sectional width that permits the continual flow of fluid from the coolant inlets 36, 38 and into the gyroid structure 44.

Referring now to FIGS. 3-6, the coolant fluid can flow from the first coolant inlet 36, into the first coolant inlet receiving cavity 90, and then into the first set of coolant channels 48. The first set of coolant channels 48 are defined in the first region 50 of the gyroid structure 44. In some examples, the first set of coolant channels 48 extend from the first coolant inlet 36, along the first region 50 of the gyroid structure 44, and to the first coolant outlet 40. According to various aspects, the first set of coolant channels 48 may direct coolant fluid in a direction that is parallel, oblique, or perpendicular to the flow of coolant fluid in the second set of coolant channels 52, and/or to the flow of the refrigerant fluid in the set of refrigerant channels 46.

According to various aspects, the coolant fluid flows through the first set of coolant channels 48 and towards a first coolant outlet receiving cavity 110. The first coolant outlet receiving cavity 110 may be defined as the space between the first coolant outlet 40, the housing 30, and the first region 50 of the gyroid structure 44. The first coolant outlet receiving cavity 110 may define one of various shapes, such as a quadrilateral shape, a triangular shape, a rounded shape, and/or one of other various shapes. According to various aspects, the first coolant outlet receiving cavity 110 defines a fluid receiving cavity that permits uniform flow of the coolant fluid from the first set of coolant channels 48 and into the first coolant outlet 40.

Referring again to FIGS. 3-6, the coolant fluid can flow from the second coolant inlet 38, into the second coolant inlet receiving cavity 100, and then into the second set of coolant channels 52. The second set of coolant channels 52 are defined in the second region 54 of the gyroid structure 44. In some examples, the second set of coolant channels 52 extend from the second coolant inlet 38, along the second region 54 of the gyroid structure 44, and to the second coolant outlet 42. According to various aspects, the second set of coolant channels 52 may direct coolant fluid in a direction that is parallel, oblique, or perpendicular to the flow of coolant fluid in the first set of coolant channels 48, and/or to the flow of the refrigerant fluid in the set of refrigerant channels 46.

According to various aspects, the coolant fluid flows through the second set of coolant channels 52 and towards a second coolant outlet receiving cavity 120. The second coolant outlet receiving cavity 120 may be defined as the space between the second coolant outlet 42, the housing 30, and the second region 54 of the gyroid structure 44. The second coolant outlet receiving cavity 120 may define one of various shapes, such as a quadrilateral shape, a triangular shape, a rounded shape, and/or one of other various shapes. According to various aspects, the second coolant outlet receiving cavity 120 defines a fluid receiving cavity that permits uniform flow of the coolant fluid from the second set of coolant channels 52 and into the second coolant outlet 42.

Additionally, it is generally contemplated that the gyroid structure 44 may define coolant removal channels that encompass an outer periphery of the first coolant outlet receiving cavity 110 and the second coolant outlet receiving cavity 120. The coolant removal channels may have a shape, size, and/or cross-sectional width that permits the continual flow of fluid from the first and second set of coolant channels 48, 52 and into the coolant outlets 40, 42.

Referring now to FIGS. 2-7, the heat exchanger 10 includes the refrigerant inlet 32 extending off of the housing 30. In some examples, the refrigerant inlet 32 is coupled to the housing 30 or integrally formed with the housing 30. For example, the refrigerant inlet 32 may be integrally formed with the front panel 60 of the housing 30 and extend off of the front panel 60. According to various aspects, the refrigerant inlet 32 is intended to guide refrigerant fluid into the gyroid structure 44. Additionally, it is generally contemplated that the refrigerant inlet 32 may defined various shapes and/or sizes and be perpendicular and/or obliquely oriented relative to the housing 30 such that the rate of refrigerant flow may be one of various flow rates.

According to various aspects, the valve 56 may be disposed in the refrigerant inlet 32. In some examples, the valve 56 may be movably coupled, or fixedly coupled, to an interior wall of the refrigerant inlet 32. In various embodiments, the valve 56 is configured to direct the flow of refrigerant into the gyroid structure 44, and/or adjust the flow rate of refrigerant fluid into the gyroid structure 44. In yet other aspects, the valve 56 may include one or more actuators in communication with a controller 130 such that a controller 130 may output a signal to the valve 56 to adjust the position of the valve 56 and the subsequent flow of refrigerant fluid. For example, the controller 130, after determining a first condition due to a greater cooling need for the battery system 18, may direct a greater amount of refrigerant fluid to the first region 50 of the gyroid structure 44, as provided herein. Additionally or alternatively, it is generally contemplated that the valve 56 may be one of various kinds of valves, such as a butterfly valve. It is further generally contemplated that the valve 56 may include a plate and/or disc that has a shape and/or size that coincides with the shape and/or size of the refrigerant inlet 32.

Referring to FIG. 4, the heat exchanger 10 includes refrigerant introduction channels 140 that are in fluid communication with the refrigerant inlet 32. In some examples, the gyroid structure 44 defines the refrigerant introduction channels 140. In such examples, the gyroid structure 44 may define one of various shapes that, in turn, define the refrigerant introduction channels 140. For example, the gyroid structure 44 may define a first conical recess 142, where the refrigerant introduction channels 140 are defined along an outer periphery of the first conical recess 142. In such examples, the first conical recess 142 may extend from the refrigerant inlet 32 and towards the refrigerant outlet 34. Additionally, the first conical recess 142 may define one of various shapes and/or sizes, where the shape and/or size of the first conical recess 142 at least partially determines the shape and/or size of the refrigerant introduction channels 140. According to various aspects, the refrigerant introduction channels 140 have a cross-section that is lesser than the cross-section of the refrigerant inlet 32. In other aspects, the refrigerant introduction channels 140 may have a cross-section greater than the set of refrigerant channels 46. The refrigerant introduction channels 140 are in fluid communication with the refrigerant inlet 32 and the set of refrigerant channels 46 such that refrigerant fluid may flow from the refrigerant inlet 32 and to the set of refrigerant channels 46 in a uniform flow. Additionally, it is generally contemplated that the refrigerant introduction channels 140 may have a shape defined by the interface of the refrigerant introduction channels 140 with the set of refrigerant channels 46, where that interface may at least partially determine a flow-rate of the refrigerant fluid into the set of refrigerant channels 46. It is further contemplated that the refrigerant introduction channels 140 may include one or more fluidic barriers that coincide with the valve 56, such that the valve 56 may direct refrigerant fluid to various segments of the refrigerant introduction channels 140.

Referring now to FIGS. 4-6, the refrigerant introduction channels 140 direct the refrigerant fluid to the set of refrigerant channels 46. The set of refrigerant channels 46 are defined in the gyroid structure 44. In some examples, the set of refrigerant channels 46 includes a first set of refrigerant channels 150 that extend through the first region 50 and a second set of refrigerant channels 152 that extend through the second region 54. In some examples, the set of refrigerant channels 46 may be in direct fluid communication with the refrigerant inlet 32, or the set of refrigerant channels 46 may be in fluid communication with the refrigerant inlet 32 via the refrigerant introduction channels 140. In some examples, the refrigerant introduction channels 140 direct refrigerant fluid in a counter-flow direction to the coolant fluid in the first set of coolant channels 48 and/or the second set of coolant channels 52. As the refrigerant fluid flows in a counter-flow direction, thermal transfer occurs between the refrigerant fluid and the coolant fluid via the gyroid structure 44.

As shown in FIGS. 5 and 6, the set of refrigerant channels 46 are in thermal communication with the first set of coolant channels 48 and the second set of coolant channels 52. The interpenetrating labyrinth network of the gyroid structure 44 that defines the set of refrigerant channels 46, the first set of coolant channels 48, and the second set of coolant channels 52 has a large surface area that facilitates heat transfer from cooling fluid housed within the coolant channels 48, 52 to the refrigerant fluid within the set of refrigerant channels 46, thereby cooling the coolant.

Referring to FIG. 4, the heat exchanger 10 includes refrigerant removal channels 160 that are in fluid communication with the set of refrigerant channels 46. In some examples, the gyroid structure 44 defines the refrigerant removal channels 160. In such examples, the gyroid structure 44 may define one of various shapes that, in turn, define the refrigerant removal channels 160. For example, the gyroid structure 44 may define a second conical recess 162, where the refrigerant removal channels 160 are defined along an outer periphery of the second conical recess 162. In such examples, the second conical recess 162 may extend from the refrigerant inlet 32 and towards the refrigerant inlet 32. The second conical recess 162 may have a shape and/or size that coincides or differs with the shape and/or size of the first conical recess 142. Additionally, the second conical recess 162 may define one of various shapes and/or sizes, where the shape and/or size of the second conical recess 162 at least partially determines the shape and/or size of the refrigerant removal channels 160. According to various aspects, the refrigerant removal channels 160 have a cross-section that is lesser than the cross-section of the refrigerant outlet 34. In other aspects, the refrigerant removal channels 160 may have a cross-section greater that the set of refrigerant channels 46. The refrigerant removal channels 160 are in fluid communication with the refrigerant outlet 34 and the set of refrigerant channels 46 such that refrigerant fluid may flow from the set of refrigerant channels 46 and to the refrigerant outlet 34 in a uniform flow. Additionally, it is generally contemplated that the refrigerant removal channels 160 may have a shape defined by the interface of the refrigerant removal channels 160 with the set of refrigerant channels 46, where the interface may at least partially determine a flow-rate of the refrigerant fluid out of the set of refrigerant channels 46 and into the refrigerant outlet 34.

Referring now to FIGS. 2-7, the heat exchanger 10 includes the refrigerant outlet 34 extending off of the housing 30. In some examples, the refrigerant outlet 34 is coupled to the housing 30 or integrally formed with the housing 30. For example, the refrigerant outlet 34 may be integrally formed with the rear panel 62 of the housing 30 and extend off of the rear panel 62. According to various aspects, the refrigerant outlet 34 is intended to guide refrigerant fluid out of the heat exchanger 10 and into the refrigerant loop 214. Additionally, it is generally contemplated that the refrigerant outlet 34 may define various shapes and/or sizes and be perpendicular and/or obliquely oriented relative to the housing 30 such that the rate of refrigerant flow may be one of various flow rates.

Referring now to FIGS. 5 and 6, a first coolant path 170 of the heat exchanger 10 generally directs coolant fluid through the heat exchanger 10. In particular, the first coolant path 170 can direct coolant fluid from the first coolant inlet 36 and into the first set of coolant channels 48. The first coolant path 170 then directs the coolant fluid out of the first coolant outlet 40 and into the first coolant loop line 216 of the first coolant loop 210.

Referring again to FIGS. 5 and 6, a second coolant path 180 of the heat exchanger 10 generally directs coolant fluid through the heat exchanger 10. In particular, the second coolant path 180 can direct coolant fluid from the second coolant inlet 38 and into the second set of coolant channels 52. The second coolant path 180 then directs the coolant fluid out of the second coolant outlet 42 and into the second coolant loop 212. According to various aspects, the direction of flow of coolant fluid in the second coolant path 180 may differ or coincide with the direction of flow of coolant fluid in the first coolant path 170. For example, the coolant fluid in the second coolant path 180 may flow in the second region 54 of gyroid structure 44 in a direction substantially parallel to the direction of flow of the coolant fluid in the first coolant path 170, which may flow in the first region 50 of the gyroid structure 44.

Referring further to FIGS. 5 and 6, a refrigerant path 190 of the heat exchanger 10 generally directs refrigerant fluid through the heat exchanger 10. In particular, the refrigerant path 190 can direct refrigerant fluid from the refrigerant inlet 32, through the refrigerant introduction channels 140, and into the set of refrigerant channels 46. The refrigerant path 190 then directs the refrigerant fluid into the refrigerant removal channels 160 and out of the refrigerant outlet 34, where the refrigerant fluid is directed to the refrigerant loop 214. According to various aspects, the direction of flow of refrigerant fluid in the refrigerant path 190 may differ or coincide with the direction of flow of coolant fluid in either the first coolant path 170 or the second coolant path 180. For example, the refrigerant fluid may flow in a counter-flow direction to the flow of coolant fluid in the first coolant path 170 and the second coolant path 180. Additionally, it is generally contemplated that the rate of refrigerant flow along the refrigerant path 190 in the first region 50 and/or the second region 54 of the gyroid structure 44 may vary or stay consistent in both regions 50, 54. For example, the valve 56 may be positioned such that a greater amount of refrigerant fluid flows through the first region 50 along the refrigerant path 190 than the second region 54 along the refrigerant path 190.

Figure 7:
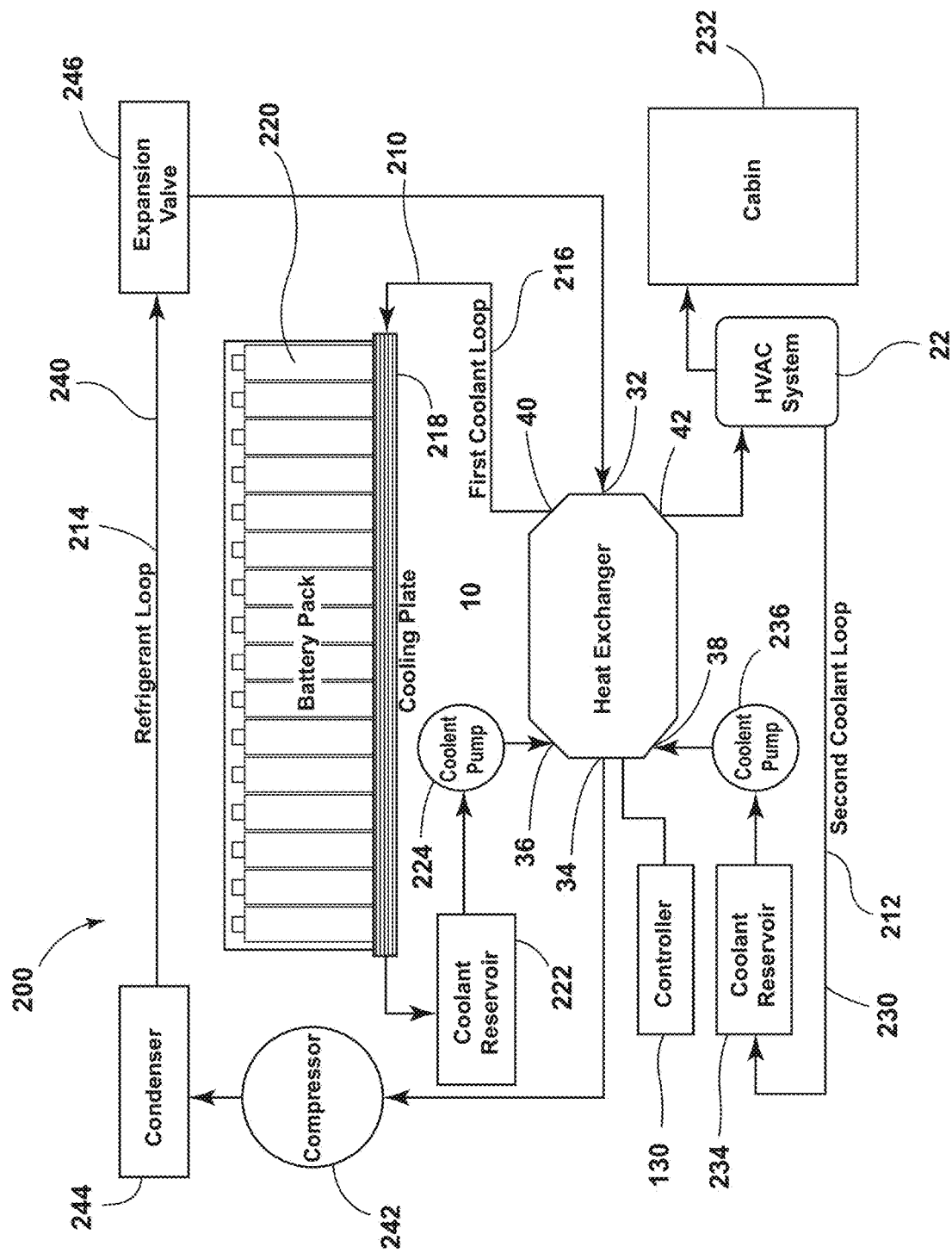
FIG. 7 is a partial schematic of a flow diagram with a heat exchanger in fluid communication with a first coolant loop, a second coolant loop, and a refrigerant loop, according to one embodiment.

Referring now to FIG. 7, a flow diagram 200 is shown that illustrates the vehicle cooling system 20. The flow diagram 200 includes a first coolant loop 210, a second coolant loop 212, and a refrigerant loop 214. The first coolant loop 210 includes a first coolant loop line 216 that directs the flow of coolant fluid through the first coolant loop 210. The first coolant loop 210 extends from the first coolant outlet 40 and to a cooling plate 218 of the battery system 18, where the cooling plate 218 is configured to cool a battery pack 220. The first coolant loop line 216 then extends from the cooling plate 218 and to a first coolant reservoir 222. The first coolant loop line 216 then extends to a first coolant pump 224 and then to the first coolant inlet 36. According to various aspects, the first coolant pump 224 is configured to generate a coolant flow that directs the coolant fluid through the first coolant loop 210.

The second coolant loop 212 includes the second coolant loop line 230 that directs the flow of coolant fluid through the second coolant loop 212. The second coolant loop line 230 extends from the second coolant outlet 42 to the HVAC system 22, which is in fluid communication with a cabin 232 of the vehicle 12. The second coolant loop line 230 then extends to a second coolant reservoir 234. The second coolant loop line 230 then extends to second coolant reservoir 234, a second coolant pump 236, and into the second coolant inlet 38. According to various aspects, the second coolant pump 236 is configured to generate a coolant flow that directs the coolant fluid through the second coolant loop 212.

The refrigerant loop 214 includes refrigerant loop line 240 that directs the flow of refrigerant fluid through the refrigerant loop 212. The refrigerant loop line 240 extends from the refrigerant outlet 34 and to a compressor 242. The compressor 242 is configured to compress the refrigerant fluid into a higher-pressure gas. During the compression, the refrigerant fluid temperature increases. The compressor 242 is also configured to drive or circulate the refrigerant fluid through the refrigerant loop 214. The refrigerant then exits the compressor 242 as the higher-pressure gas and enters the refrigerant loop line 240, which leads to a condenser 244.

The refrigerant fluid, which is in the higher-pressure gas state, then enters a condenser 244. The condenser 244 may be configured as a heat exchanger that may exchange heat with ambient air. The condenser 244 condenses the refrigerant to a liquid, releasing heat. The refrigerant loop line 240 then directs the refrigerant to an expansion valve 246. The expansion valve 246 reduces the pressure of the refrigerant fluid, thereby cooling the refrigerant fluid. The refrigerant loop line 240 then directs the cooled refrigerant fluid to the refrigerant inlet 32, where the refrigerant fluid enters the heat exchanger 10 and gyroid structure 44, cooling the coolant fluid in the first coolant loop 210 and the second coolant loop 212.

According to various aspects, the vehicle cooling system 20 includes the controller 130. The controller 130 has a processor and memory that stores instructions. The controller 130 can be disposed in various locations throughout the vehicle 12. The controller 130 may be a vehicle controller or a stand-alone controller. The controller 130 may be in communication with various aspects of the heat exchanger 10 and/or the vehicle cooling system 20. For example, the controller 130 may be in communication with the valve 56, the first coolant pump 224, the second coolant pump 236, and/or various other components. The controller may also be in communication with one or more sensors of a sensor system. For example, the controller 130 may be in communication with a temperature sensor, a flow sensor, a proximity sensor, and/or various other sensors. Additionally, it is generally contemplated that the vehicle 12 may include a plurality of controllers, where the function of the controller 130 may be executed singly or jointly by the plurality of controllers.

The processor may execute the instructions to cause the controller 130 to operate one or more devices. In particular, the processor, after determining a condition, may execute instructions that, in turn, cause an actuator of the valve 56 to move the valve 56 to a first position or a second position. For example, the controller 130, via information from the sensor system, may determine that there is a greater demand for cooling of the battery system 18. The controller 130 may then determine a first condition and output a signal to the actuator to adjust a position of the valve 56 such that a greater amount of refrigerant fluid flows through the first region 50 of the gyroid structure 44. The refrigerant fluid in the first region 50 is in counter flow with the coolant fluid in the first coolant loop 210, which flows through the cooling plate 218 of the battery pack 220, such that the coolant fluid in the first coolant loop 210 is cooled. Additionally, the controller 130, via information from the sensor system, may determine that there is a greater demand for cooling in the HVAC system 22. The controller 130 may then determine a second condition and output a signal to the actuator to adjust a position of the valve 56 such that a greater amount of refrigerant fluid flows through the second region 54 of the gyroid structure 44. The refrigerant fluid in the second region 54 is in counter flow with the coolant fluid in the second coolant loop 212, which flows through the HVAC system 22, such that the coolant fluid in the second coolant loop 212 is cooled. Additionally, it is generally contemplated that the processor may execute instructions that actuate the first coolant pump 224 or the second coolant pump 236. For example, the processor can output a signal that causes either coolant pump 224, 236 to operate at a first speed, a second speed, a third speed, or to operate in a static condition.

Use of the presently disclosed device may provide for a variety of advantages. For example, the heat exchanger 10 may provide for efficient heat transfer between coolant and refrigerant in a compact structure. In particular, the use of a gyroid structure 44 permits efficient thermal transfer, due to the high surface-area-to-volume ratio of the gyroid structure 44 in the heat exchanger 10, relative to traditional heat exchangers. Additionally, the use of first coolant loop 210 that passes through the first region 50 and the second coolant loop 212 that passes through the second region 54, which both my flow in a counter-flow direction to the refrigerant loop 214, provides for a heat exchanger 10 that may cool multiple aspects of the vehicle 12 simultaneously. Further, the use of the valve 56 in the refrigerant inlet 32 that directs refrigerant fluid into the first region 50 and/or the second region 54, provides for a heat exchanger 10 that can selectively direct a greater amount of refrigerant fluid either through the first region 50 and/or the second region 54, depending on demand. For example, the valve 56 may direct a greater amount of refrigerant fluid through the first region 50 when coolant fluid in the first coolant loop 210 requires greater cooling that coolant fluid in the second coolant loop 212.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A heat exchanger, comprising:
    a housing defining a refrigerant inlet, a refrigerant outlet opposing the refrigerant inlet, at least one coolant inlet, and at least one coolant outlet;
    a gyroid structure disposed within the housing, the gyroid structure defining a set of refrigerant channels that direct refrigerant fluid through the gyroid structure and at least one set of coolant channels that direct coolant fluid through the gyroid structure, wherein the set of refrigerant channels direct refrigerant fluid in a counter-flow to a flow of the coolant fluid in the at least one set of coolant channels;
    a first conical recess defined in the gyroid structure and proximate the refrigerant inlet, the first conical recess defining a refrigerant introduction channels that are in fluid communication with the set of refrigerant channels; and
    a second conical recess defined in the gyroid structure and proximate the refrigerant outlet, the second conical recess defining refrigerant removal channels that are in fluid communication with the set of refrigerant channels.

2. The heat exchanger of claim 1, wherein the gyroid structure defines at least one coolant inlet receiving cavity proximate the at least one coolant inlet and at least one coolant outlet receiving cavity proximate the at least one coolant outlet.

3. The heat exchanger of claim 1, wherein the at least one set of coolant channels includes a first set of coolant channels that flow through a first region of the gyroid structure and a second set of coolant channels that flow through a second region of the gyroid structure, the second set of coolant channels directing a flow of the coolant fluid in a direction parallel to a flow of the coolant fluid in the first set of coolant channels.

4. The heat exchanger of claim 3, wherein the refrigerant fluid flows through the first region and the second region of the gyroid structure.

5. The heat exchanger of claim 1, wherein the refrigerant inlet is defined on a front panel of the housing and the refrigerant outlet is defined on a rear portion of the housing, and wherein the at least one coolant inlet and the at least one coolant outlet are defined on a side panel of the housing.

6. A heat exchanger, comprising:
    a housing defining a refrigerant inlet, a refrigerant outlet opposing the refrigerant inlet, at least one coolant inlet, and at least one coolant outlet, wherein the refrigerant inlet is defined on a front panel of the housing and the refrigerant outlet is defined on a rear portion of the housing, and wherein the at least one coolant inlet and the at least one coolant outlet are defined on a side panel of the housing, wherein the at least one coolant inlet includes a first coolant inlet defined on a first side panel of the housing and a second coolant inlet defined on a second side panel of the housing, and wherein the at least one coolant outlet includes a first coolant outlet defined on the first side panel of the housing and a second coolant outlet defined on the second side panel of the housing-;

a gyroid structure disposed within the housing, the gyroid structure defining a set of refrigerant channels that direct refrigerant fluid through the gyroid structure and at least one set of coolant channels that direct coolant fluid through the gyroid structure;

a first conical recess defined in the gyroid structure and proximate the refrigerant inlet, the first conical recess defining a refrigerant introduction channels that are in fluid communication with the set of refrigerant channels; and a second conical recess defined in the gyroid structure and proximate the refrigerant outlet, the second conical recess defining refrigerant removal channels that are in fluid communication with the set of refrigerant channels.

7. The heat exchanger of claim 1, wherein the first conical recess extends towards the second conical recess.

* * * * *